(12) United States Patent
Wall

(10) Patent No.: US 10,718,465 B2
(45) Date of Patent: Jul. 21, 2020

(54) FREE-STANDING SUPPORT STAND FOR TAXIDERMY MOUNTS

(71) Applicant: Chad Wall, Springfield, LA (US)

(72) Inventor: Chad Wall, Springfield, LA (US)

(*) Notice: Subject to any disclaimer, the term of this patent is extended or adjusted under 35 U.S.C. 154(b) by 57 days.

(21) Appl. No.: 16/100,703

(22) Filed: Aug. 10, 2018

(65) Prior Publication Data
US 2020/0049306 A1 Feb. 13, 2020

(51) Int. Cl.
| | |
|---|---|
| B29L 31/00 | (2006.01) |
| F16M 11/22 | (2006.01) |
| G09B 23/36 | (2006.01) |
| F16M 13/02 | (2006.01) |
| B44C 5/02 | (2006.01) |

(52) U.S. Cl.
CPC ............ *F16M 11/22* (2013.01); *G09B 23/36* (2013.01); *B29L 2031/7028* (2013.01); *B44C 5/02* (2013.01); *F16M 13/02* (2013.01)

(58) Field of Classification Search
USPC .......... 248/174, 364.4, 346.5, 152; 40/606.1, 40/606.08, 606.03
See application file for complete search history.

(56) References Cited

U.S. PATENT DOCUMENTS

| | | | | |
|---|---|---|---|---|
| 1,946,779 | A | * | 2/1934 | Conway .................. A47F 5/112 248/37.3 |
| 2,252,000 | A | * | 8/1941 | Grunow .................. B01J 10/00 29/428 |
| 2,825,519 | A | * | 3/1958 | Rowan .................... A47F 5/114 248/174 |
| 4,910,898 | A | * | 3/1990 | Hector ..................... G09F 7/22 40/479 |
| 5,779,294 | A | | 7/1998 | Magri |
| 6,458,434 | B1 | * | 10/2002 | Coombs, Jr. .......... B29C 33/304 425/524 |
| 6,561,468 | B2 | | 5/2003 | Williamson |
| 6,828,035 | B1 | | 12/2004 | Goettl |
| 7,243,888 | B2 | | 7/2007 | Van Peek |
| 9,972,221 | B2 | | 5/2018 | Raby |
| 2005/0006505 | A1 | * | 1/2005 | McNeeley .............. A47J 43/25 241/95 |
| 2009/0026347 | A1 | | 1/2009 | North |
| 2015/0130103 | A1 | | 5/2015 | Dewey et al. |

* cited by examiner

*Primary Examiner* — Alfred J Wujciak
(74) *Attorney, Agent, or Firm* — Keaty Law Firm LLC

(57) ABSTRACT

This invention provides for a pyramidal free-standing upright support for a taxidermy mount. The support body is formed by a plurality of trapezoidal-shaped substantially planar body panels and a flat top panel detachably securable together. The top panel is provided with a central opening, which receives an attachment assembly. The attachment assembly, in turn, holds the taxidermy mount above the top panel when in use. The body panels and the top panels can be transported flat and assembled on site.

11 Claims, 6 Drawing Sheets

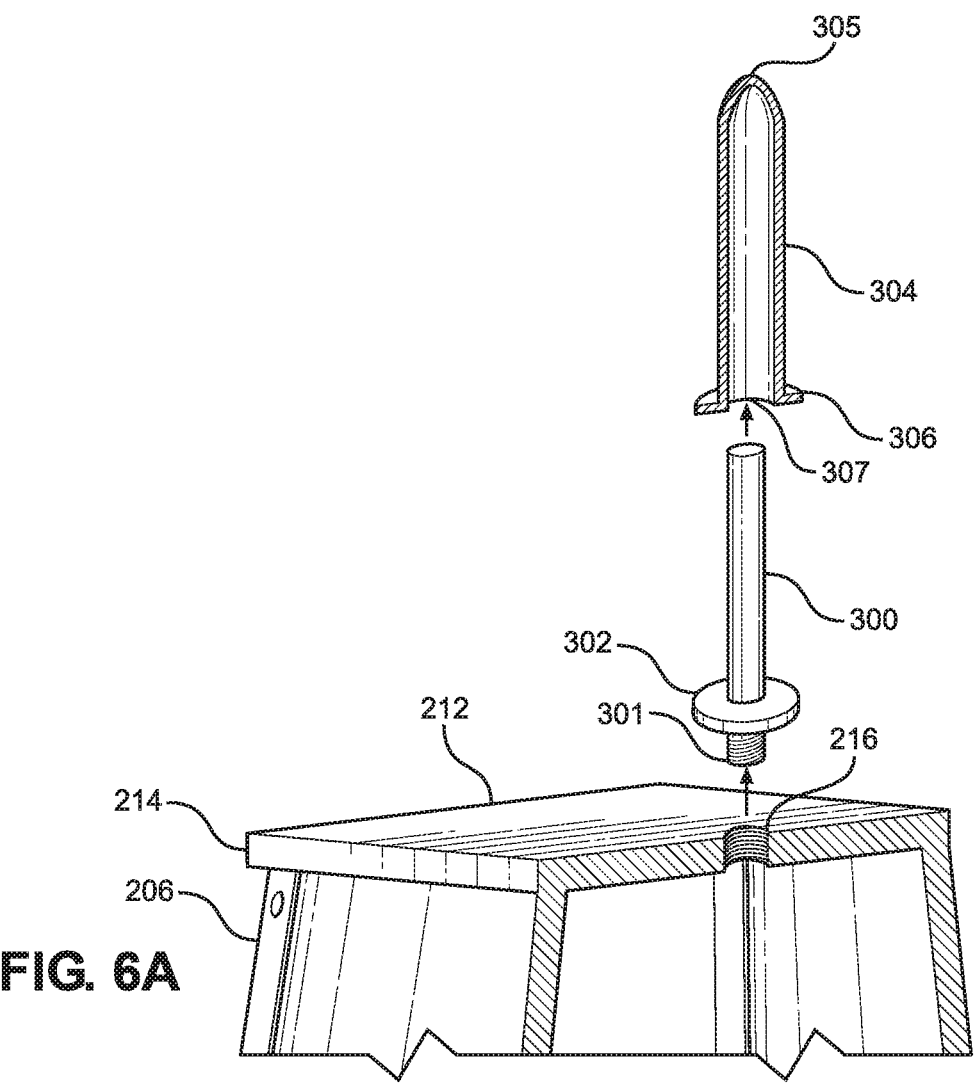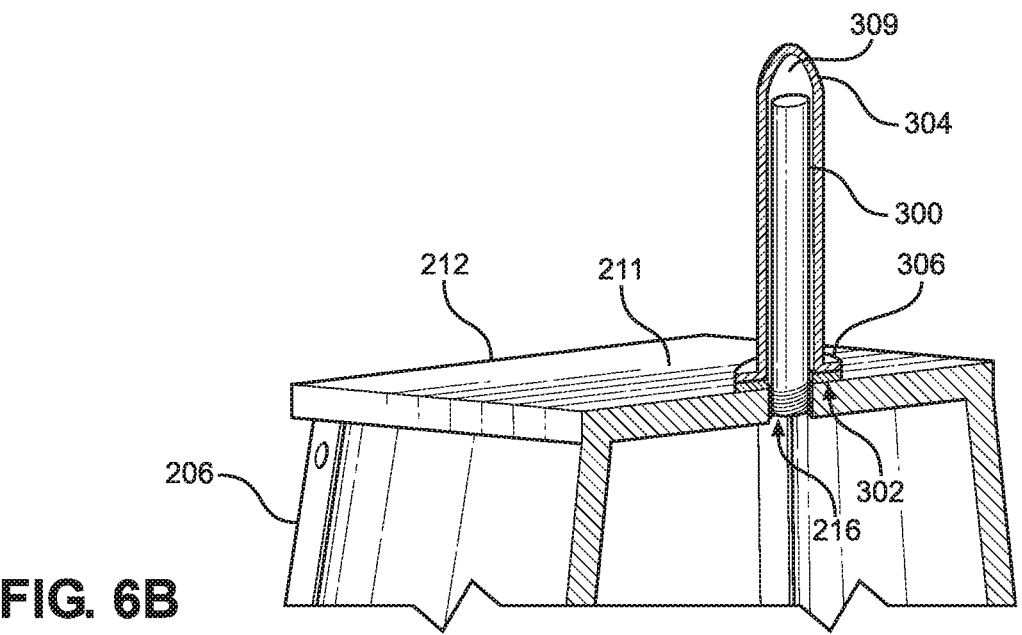

FREE-STANDING SUPPORT STAND FOR TAXIDERMY MOUNTS

BACKGROUND OF THE INVENTION

This invention relates to a taxidermy stand for mounting dead animals or parts of the dead animals, and more particularly to a standalone structure for supporting the dead animal or parts thereof.

Mounts are created to display an animal and are popular with hunters seeking to display a trophy prize or catch. Mounts are also popular with outdoor retailers and hunting supply companies which use the mounts as advertising to create a hunter-friendly atmosphere in a store. Museums of natural history use dead animal displays for educational purposes. Animals commonly mounted include game, such as deer, birds, or bear. The taxidermy involves preparing, stuffing, and mounting the skin of the dead animal. Mounting is usually performed using an armature, and stuffing is done by filling the skin of the animal with natural or artificial materials, such as cotton, wood, polyester resin, glass cloth, etc., molded to have the shape of the animal. Dead animals that have undergone a taxidermic process may be displayed on walls of buildings via mount hangers.

As game animals are commonly prized for their antlers, fierce teeth, or large size, mounts usually focus on the head of the animal after cutting off the rest of the animal body. This makes display on the wall a natural choice for mounts, and mounts are thus usually flat along one edge which makes them a natural fit for the line of a wall. Due to ease of installation, hanging apparatuses for mounts are a conventional taxidermic method of displaying the dead animal. Taxidermists can also prepare animals whole, if requested, for customers who wish to display a scene or the animal in a striking pose. In these cases, stylized mounts are often made to look like wood, or rock, or other natural material resembling the animal's habitat. These stylized mounts are typically hard to disassemble and cumbersome to transport.

Although there exist various mount display options, they are usually difficult to set up and install, do not readily yield to retrofitting or customization, and are cumbersome to store and transport.

For example, U.S. Pat. No. 5,779,294 for a "Mounting System and Method," issued on Jul. 14, 1998 to inventor Steven A. Magri, provides for a system and method that includes a mounting device for handling an object during treatment or preparation and for mounting the object to a display member for displaying the object. The mounting system and method is particularly suited for use by a taxidermist to handle and mount a fish or other animal prepared by the taxidermist. The mounting device includes a mounting plug adapted to be received in a recessed region in the display member. One or more object engaging members extend from the mounting plug to engage and secure the object. A mounting rod extends from a second end of the mounting plug and includes a gripping region, for easy gripping and handling by a user. The mounting method includes inserting the mounting rod through an aperture in the display member so that the mounting plug is received into the recessed region in the display member. A fastener is then engaged with a fastener engaging region on the mounting rod to secure the mounting device to the display member. In one example, a hanger is provided on the mounting rod against a rear surface of the display member and the mounting rod is severed proximate the hanger to allow the hanger to lie against a flat surface, for easily hanging and displaying.

U.S. Pat. No. 9,972,221 for a "Repositionable Taxidermy Mount Apparatus," issued on May 15, 2018 to inventor Samuel F. Raby, provides for a repositionable taxidermy mount apparatus that allows a user to quickly and easily reposition a taxidermy type mounted animal or animal portion. The apparatus provides for motion about a plurality of axes creating the ability to display a taxidermy mounted animal in a multitude of different positions and orientations. The apparatus further includes an easily interchangeable swivel plate device which allows the user to display different mounted animals at various mount angles. It is noted that swivel plate device is simply and easily removed from swing arm device and may readily placed on a pedestal such as pedestal by placing bore hole over rod. Furthermore, swivel plate device having animal bust attached thereto, may be simply and easily replaced with a second instance of swivel plate device having a second instance of animal bust attached thereto. Thus, using the described method, if a user tires of displaying for instance a deer bust, the user may replace the deer bust with an antelope bust.

U.S. Pat. No. 7,243,888 for a "System and Apparatus for Mounting a Taxidermy Trophy," issued on Jul. 17, 2007 to inventor Russell Van Peek, provides for a system for mounting taxidermy animal trophies on mounting devices that comprises a support platform having a rod protruding therefrom. The rod is a ribbed member having a large plurality of features for securing an animal mount, such as a skull, thereto. For example, the ribbed member may comprise a concrete reinforcement bar that may be sized in diameter and length according to the size of the mount. The rod uses the natural occurring or existing hole or holes in the back of the skull for support thereof. The rod may extend straight from the support platform, such as for wall mounting purposes, or may comprise a bent portion at a distal end thereof for surface display of the mount.

U.S. Pat. No. 6,458,434 for a "Pedestal Mounted Taxidermy Mannequin and Mold for the Manufacturing Thereof," issued on Oct. 1, 2002 to assignee Joe Coombs Classics, Inc., provides for a pedestal mounted taxidermy mannequin, and a mold for manufacturing same. Once molded, the taxidermy mannequin includes an elongated, bored hole formed in a bottom portion thereof, and a rigid block positioned in supporting relation to the bored hole, thereby providing structural reinforcement and integrity to the bored hole. A rod is inserted into the bored hole to mount the mannequin to a pedestal. The mold for manufacturing the mannequin is an injection mold into which an elongated rod is inserted after the polyurethane has been injected therein. Just prior to hardening of the polyurethane, the end is removed, thereby leaving a bored hold in the mannequin form.

U.S. Pat. No. 6,828,035 for a "Wall Pedestal for Displaying Animal Heads and Other Wildlife Objects," issued on Dec. 7, 2004 to inventor Bob Goettl, provides for a wall pedestal for displaying and rotating an animal head and other wildlife objects next to a wall. The wall pedestal includes a wall mounting plate adapted for securing the pedestal to the wall at various heights. The wall mounting plate includes an outwardly extending horizontal support arm. A far end of the horizontal support arm includes a threaded bore for receiving a threaded lower end of a vertical pivot rod. An upper end of the vertical pivot rod is slidably received in a lower portion of a vertical sleeve. A top portion of the vertical sleeve is attached to a portion of a display mounting plate. The display mounting plate is adapted for attachment to the wildlife object suspended the object thereon.

U.S. Patent Application Publication No. 2009/0026347 for a "Taxidermy Mounting Tool and Method," published on Jan. 29, 2009 by inventor Michael A. Noon, discloses a taxidermy mounting tool for performing a taxidermy procedure, wherein the taxidermy mounting tool includes a plug adapted to be disposed in an aperture formed in the manikin and formed on an end of a means for posing.

U.S. Patent Application Publication No. 2015/0130103 for a "Method of Making a Manikin with an Embedded Stand Component," published on May 14, 2015 by inventor Dawayne Dewey et al., discloses a method of making a foam manikin with a stand. The method includes sculpting a sculpture of the manikin and forming the sculpture around a mating portion. Then a mold is formed using the sculpture. The mold may include an opening that is formed around the mating portion. The mold may be made in a plurality of pieces and may be taken apart and put back together. To form the manikin, the mold is secured around the mating portion and the mold is filled with a foam. Once filled with foam, the manikin is formed with at least a portion of the mating portion embedded within. The mating portion may be releasably attached to a stand so that the manikin may stand in an upright position.

Lastly, U.S. Pat. No. 6,561,468 for a "Mounting System for Displaying a Bird," issued on May 13, 2003 to inventor Don Williamson, provides for an apparatus for mounting and displaying a taxidermy display, usually a bird or fowl. A bird is mounted on a rod appropriately sized to the birds size and weight. Said rod may be bent to effect the desired presentation of the mounted bird. Types of mounts include landing birds, flying birds right and left directions, or others not traditionally used. The bird is secured on the rod eliminating wires for holding the bird and eliminating driftwood as a mounting base. The resulting combination of the rod with its ability to be bent to and then holding the desired position, the affixing of the bird to that rod, and the affixing of the rod to a mounting base which may be securely affixed to a wall provides unsurpassed stability for the mounted bird. The rod being fixedly or adjustably joined to the mounting base also provides a permanent and more stable mounting apparatus than the heretofore unstable methods of mounting birds.

While the above technical solutions may be beneficial in certain circumstances, there remains a need for a standalone taxidermy stand that accepts custom mounts, is configured to display the animal in a location not attached to the wall, is retrofittable to pre-existing methods of taxidermy, such as mounts stuffed or tailored to fit other displays including those typically used with wall hangers, allows for a high level of customization, is easy to quickly assemble as well as disassemble, and is convenient to pack for travel.

SUMMARY OF THE INVENTION

It is, therefore, an objective of the present invention to provide a standalone mounting structure for displaying an animal or portion of an animal, the structure being configured to stand vertically on a horizontal surface.

It is another object of the present invention to provide a standalone support structure that can be easily transported, such as for instance to a trade show or other such event, and that can be quickly assembled and disassembled from and to, a flat configuration.

It is further an objective of the present invention to provide a taxidermy stand that is customizable by the owner allowing to attach a plaque, etch a design or engraving, attach cut-outs, etc.

It is further an objective of the present invention to allow the mount to rotate horizontally while supported by the stand.

It is further an objective of the present invention to provide a complete kit for retrofitting existing taxidermy displays to be supported by a free-standing stand.

These and other objects of the invention are achieved through a provision of a standalone or free-standing taxidermy stand for an animal mount, which lends itself to a retrofit of existing mounts. This invention provides for a pyramidal free-standing upright support for a taxidermy mount. The support body is formed by a plurality of trapezoidal-shaped substantially planar body panels and a flat top panel detachably securable together. The top panel is provided with a central opening, which receives an attachment assembly. The attachment assembly, in turn, holds the taxidermy mount above the top panel when in use. The body panels and the top panels can be transported flat and assembled on site and later disassembled, if need be.

The standalone taxidermy stand of the present invention allows for the retrofitting of mounts designed to be hung on the wall so that those mounts will be able to stand alone with the aid of the present invention. This opens possibilities for hunters or hunting based companies to display mounts at home or the place of business as well as travel and display the same mounts. As the stand may be customizable with engravings and plaques, the stand can be styled according to a desired look. The stand of the present invention may further be customized to the display of smaller game such as waterfowl.

BRIEF DESCRIPTION OF THE DRAWINGS

Reference will now be made to the drawings, wherein like parts are designated by like numerals, and wherein:

FIG. 6A is a detail of the support of the preferred embodiment of the present invention showing the top panel and an exploded view of the attachment assembly; and FIG. 6B is a detail view of the top panel and a partially sectional view of the attachment assembly.

DETAILED DESCRIPTION OF THE INVENTION

Figure 1:
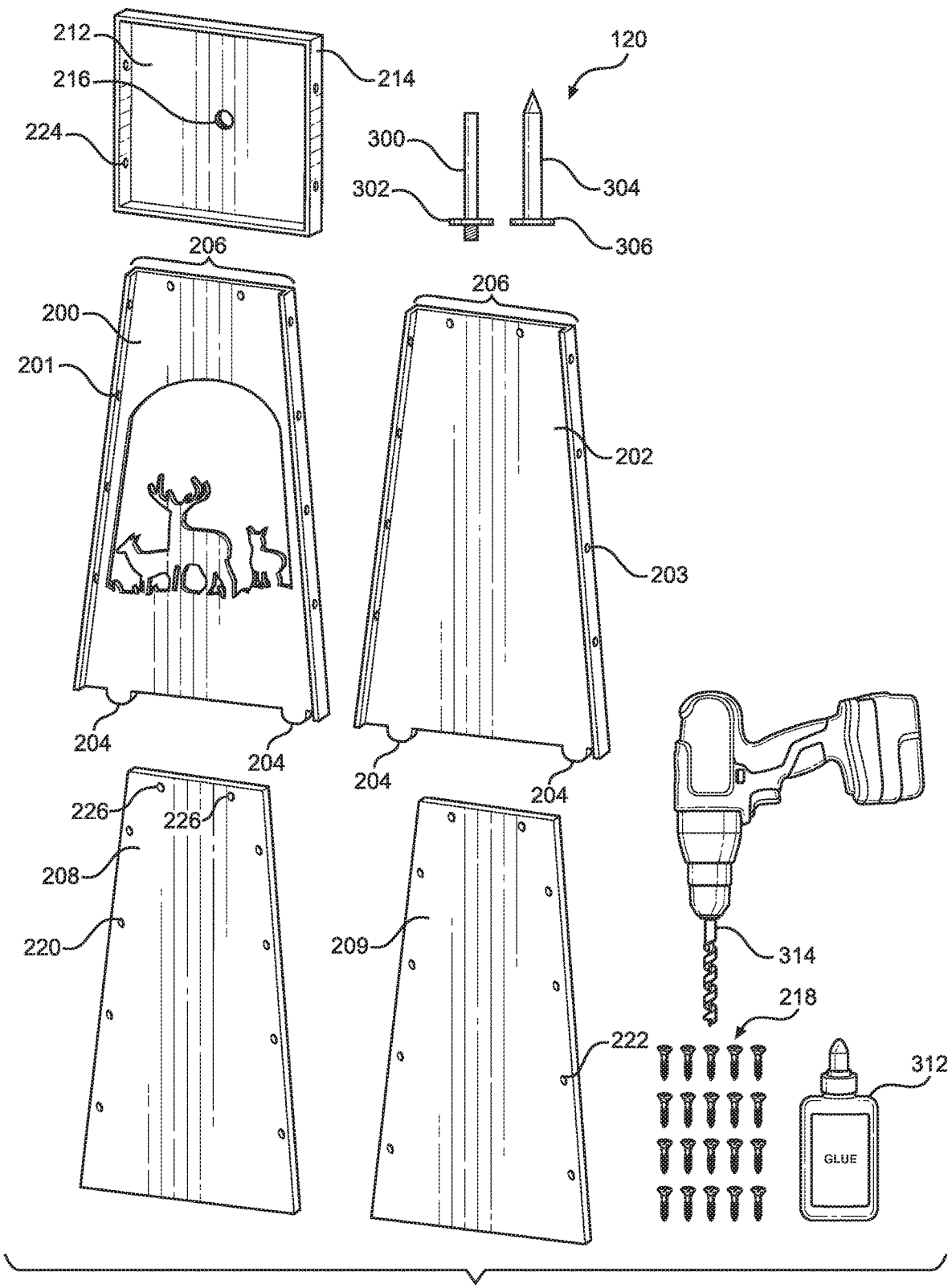
FIG. 1 illustrates the free-standing support structure in a disassembled condition and the retrofit kit components.
Figure 2:
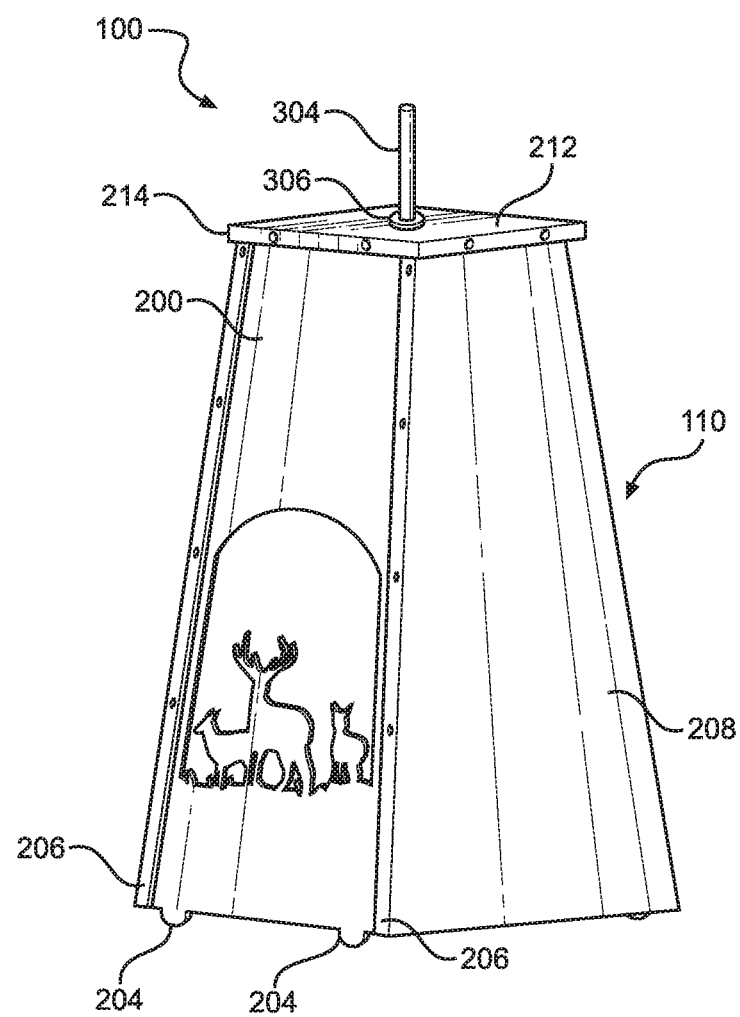
FIG. 2 is a perspective view of the stand according to the present invention as assembled but without a taxidermy mount.
Figure 3:
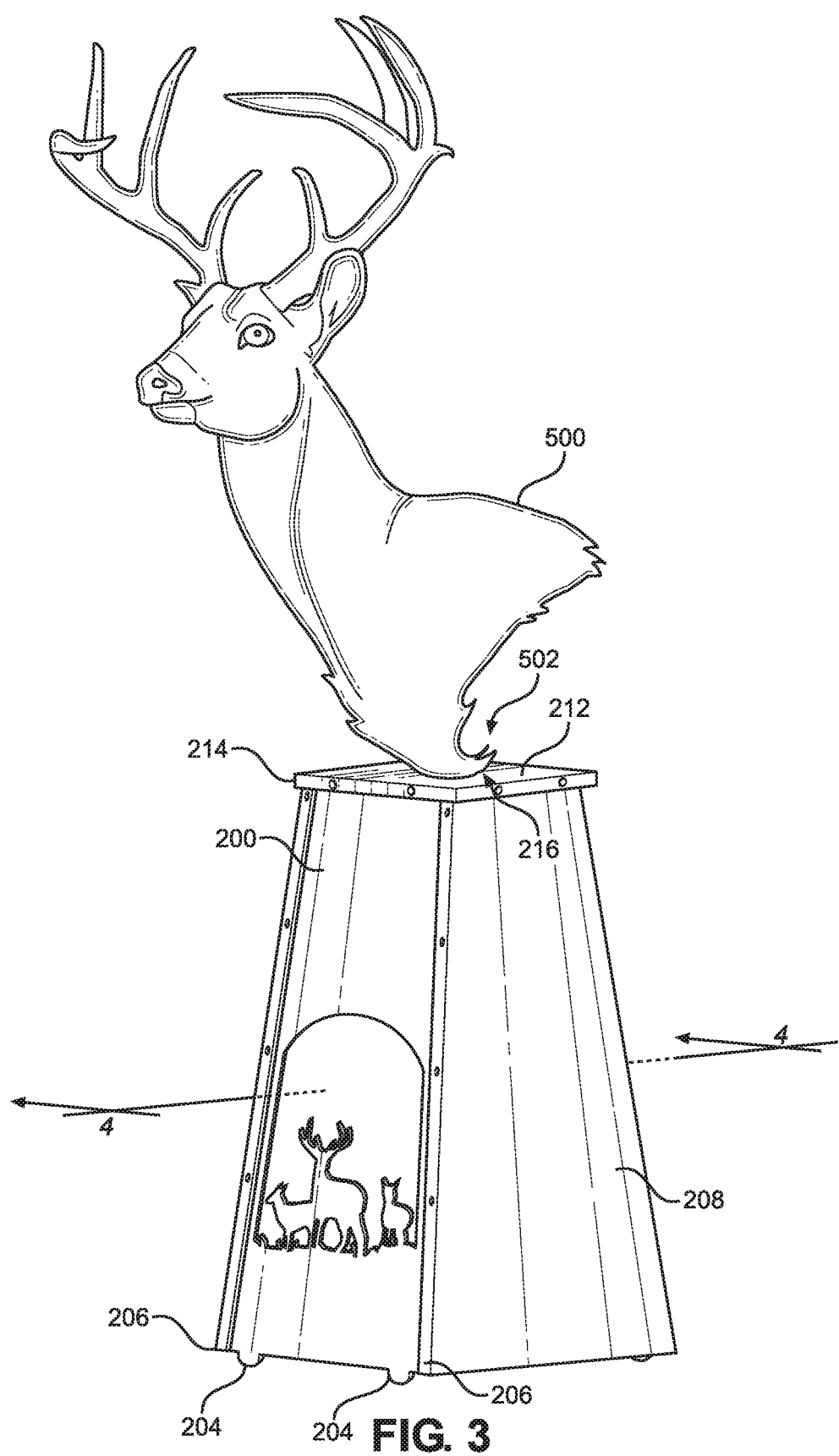
FIG. 3 is a perspective view of the stand of the present invention assembled and supporting a deer head mount.

Turning now to the drawings in more detail, with particular reference to FIGS. 1-3 and 5, the free-standing taxidermy stand of the present invention is designated by numeral 100. The standalone taxidermy stand 100 comprises a generally pyramidal body 110 and an attachment assembly 120 detachably secured to the body 110. The illustrated embodiment shows a truncated square pyramid although it will be understood that differently shaped upright structures may be used for forming the stand body.

The body 110 comprises a front panel 200, a back panel 202, two side panels 208, 209, and a flat top panel 212 secured together when in an assembled state. Screws 218, or other mechanical devices, are used to secure the panels 200, 202, 208, 209, and 212 together. In one aspect of the invention the panels have planar configuration, and the top panel 212 is oriented horizontally when the body 110 is assembled.

The top panel 212 of the stand 100 has a central opening 216 configured to engage the attachment assembly 120. The attachment assembly comprises a male connector 300 with a circumferential flange 302 and a female connector 304 with a circumferential flange 306. The male connector flange 302 is secured a distance from a bottom end of the male connector, such that a bottom part of the male connector fits into the central opening 216, while the male connector flange 302 rests on an upper surface of the top panel. The female connector flange 306 is secured to the bottom end of the female connector. The male connector 300 is frictionally slidably rotationally engaged with the female connector 304 allowing a relatively free, 360-degree rotation of a taxidermy, mount 500.

As shown in more detail in FIGS. 6A and 6B, the male connector 300 has a cylindrical configuration with a threaded lower part 301 below the flange 302. The threads of the male connector 300 match internal threads of the top panel opening 216. In the assembled position, the lower part 301 is fitted into the opening 216 and is engaged therein while the flange 302 rests on the upper surface 211 of the top panel 212. It is envisioned that the male connector 300 may be rigidly attached to the top panel 212, if desired, such as by welding, adhesive, and the like. It is also within the scope of this invention to form the male connector without a flange as long as the male connector is firmly engaged with the top panel 212 and provides sufficient structural support for the taxidermy mount 500.

The female connector 304 is configured as a hollow cylindrical body with a top closed end 305 and an open bottom end 307. The longitudinal dimension of the female connector 304 is slightly greater than the longitudinal dimension of the male connector 300. An internal diameter of the open inner channel 309 of the female connector 304 is slightly greater than the outer diameter of the male connector 300. The female connector 304 is configured to frictionally detachably engage the male connector 300 by receiving the male connector 300 in the channel 309. When thus engaged, the female connector flange 306 rests on the male connector flange 302. The attachment assembly permits free rotation of the taxidermy mount 500 in relation to the vertical axis formed by the male connector 300 through free rotational engagement between the female connector 304 with the male connector 300. If desired, a lubricant may be applied between the flanges 302 and 306 to facilitate rotation of the taxidermy mount 500.

Figure 5:
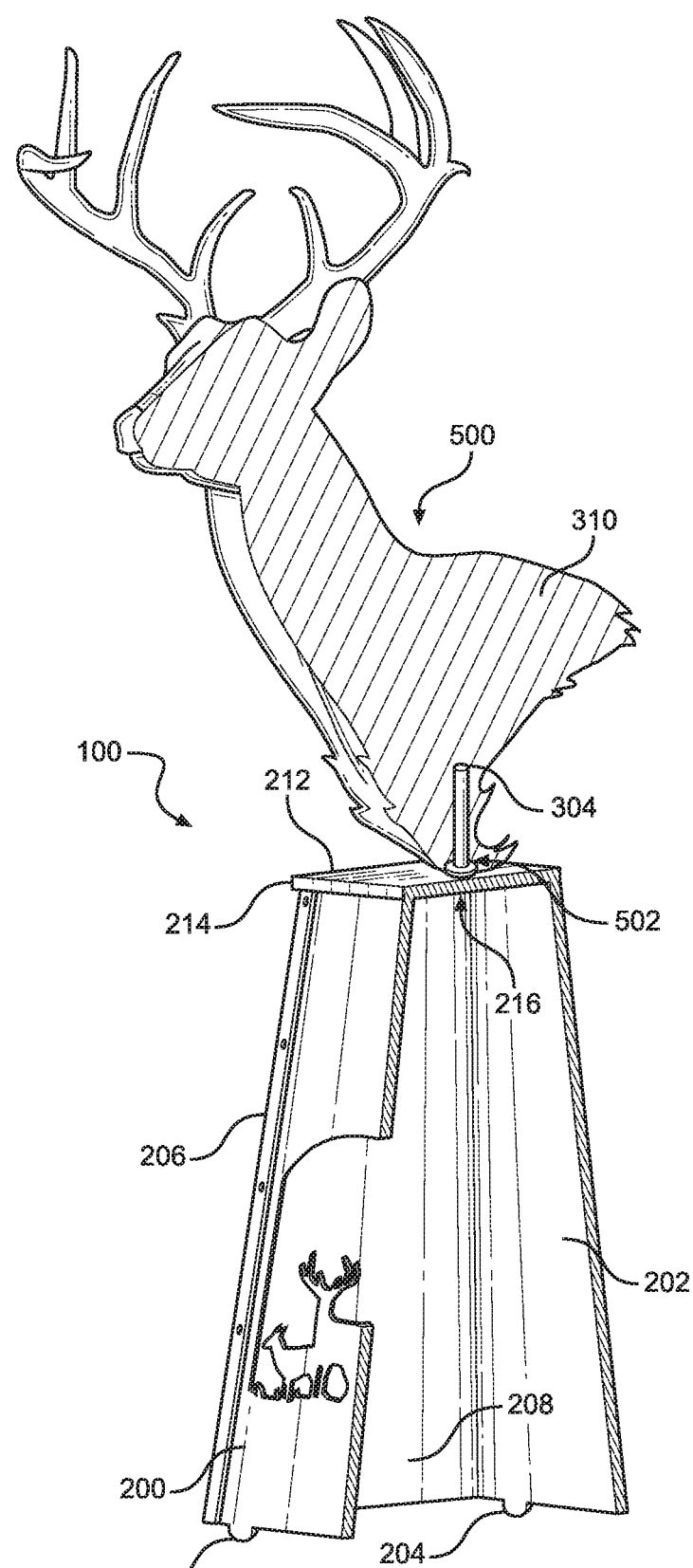
FIG. 5 is a partially cutaway view of the stand of the present invention, assembled, and supporting a deer head mount.

As can be seen in FIG. 5, the taxidermy mount 500 is provided with a bottom opening 502, which is configured to receive the attachment assembly 120 therein. The outer diameter of the female connector 304 is made to match the bottom opening 502 so that tight frictional engagement is formed between the female connector 304 and the opening 502. In this manner, the attachment assembly 120 supports the taxidermy mount on the stand body 110.

If desired, the uppermost end 305 of the female connector 304 can form a sharp or pointed end to facilitate insertion of the female connector 304 into the opening 502. With polyurethane stuffing, shown schematically in FIG. 5 and designated by numeral 310, the pointed end 305 of the female connector 304 is particularly beneficial as it allows a quick and easy connection between the taxidermy mount 500 and the stand body 110.

Figure 4:
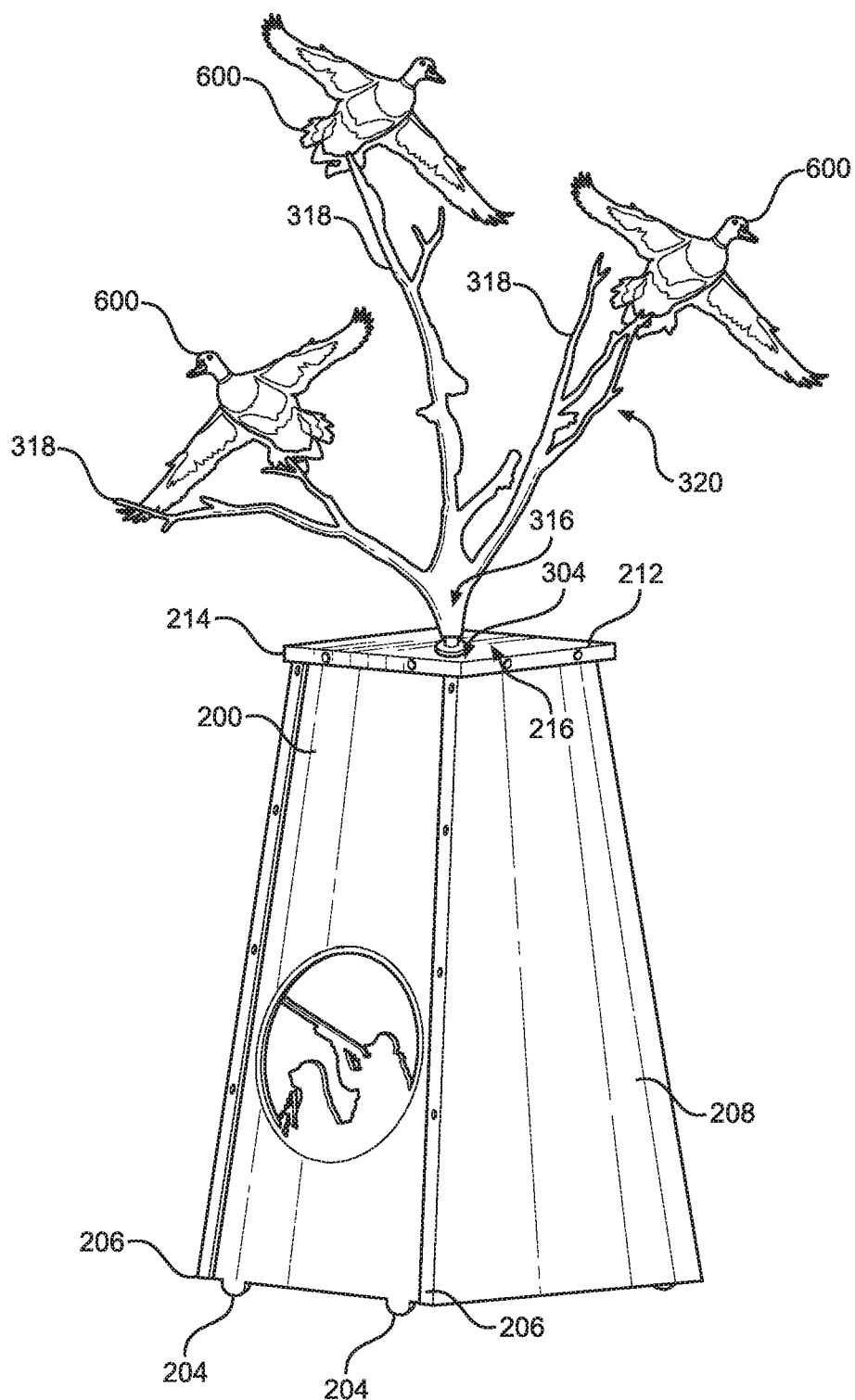
FIG. 4 is a perspective view of the stand of an alternate embodiment of the present invention assembled with branching supports modeled after tree branches and supporting waterfowl.

In the embodiment shown in FIG. 4, the female connector 304 may engage a feature of a mounted display 320, which is not the taxidermy mount per se. As illustrated in FIG. 4, the display includes a plurality of wood branches 318 extending from a vertically oriented main branch 316. In this embodiment, where the main branch 316 is made hollow, the attachment assembly 120 engages the display 320 via the female connector 304 inserted into the hollow main branch 316. In this exemplary embodiment, the taxidermy display includes one or more smaller game, for instance birds 600, that are secured to the branches 318. Similar to the embodiment of FIG. 5, the embodiment of FIG. 4 allows for free rotation of the display 320 about a vertical axis in relation to the stand body 110.

The body 110 of the free-standing stand 100 is configured for easy to assembly and disassembly. In the exemplary embodiment of FIGS. 1-6, the body 110 is formed with trapezoidal shaped body panels 200, 202, 208, and 209 and with rectangular shaped top panel 212. The front panel 200 and the back panel 206 are provided with unitary-formed extensions 204 that form the legs of the stand 100. The leg extensions 204 can be formed arcuate or rectangular, or other convenient configuration, to support the body 110 on a floor or on the ground. The side panels 208 and 209 do not have such extension, and the bases of the side panels do not extend to the ground.

The front panel 200 and the back panel 202 are provided with longitudinal side folds 206 extending along opposing sides of the isosceles trapezoids 200 and 202. When assembled, the side folds 206 face inward toward the center of the stand body 110. In the preferred embodiment of the invention, the side panels 208 match the longitudinal dimensions of the front panel 200 and the back panel 202 sans leg extensions 204.

A plurality of equidistantly spaced openings 201 and 203 are formed in the side folds 206 of the front panel 200 and the back panel 202, respectively. A matching number of openings 220 and 222 are formed in the side panels 208 and 209, respectively. The openings 201, 203, 220, and 222 are configured to receive the securing members, such as screws 218 therein to attach the panels of the stand body 110 together. In the assembled position, the side folds 206 overlap the longitudinal edges of the side panels allowing the screws to be inserted in the aligned openings.

The top panel 212 is provided with a downwardly extending peripheral lip 214. The lip 214 has a pair of apertures 224 along each side of the top panel 212. Each side panel 200, 202, 208, and 209 has a pair of apertures 226 that match the top panel apertures 224. When aligned, the apertures 224 and 226 allow a securing member, such as a screw 218 to be inserted therein and thus secure the top panel 212 to the side panels 200, 202, 208, and 209.

To generate ease of use, all attachments are preferably screw based and uniform in type as well as size, for this allows for greater ease of use by allowing both self-leveling and quick assembly with a single tool such as a single screwdriver or hex key. The self-leveling aspect of the stand 100 is achieved with a screw-based system, as all screws 218 may be partially secured but not fully tightened: the stand-alone taxidermy stand for mounts 100 will be able to slightly shift to fit the shape of minor ground variations, and the screw can then be tightened to secure that position. This allows the stand 100 to accommodate minor variations in floor indentations or types.

The stand 100 can be formed from a variety of materials, such as metal, wood, strong plastic, cardboard, etc. The panels of the body 110 can be decorated with any desired indicia by printing, engraving, attaching a cutout, a design, marketing slogans, etc. When assembled, the panels form a truncated pyramid shape, although it will be understood that other body shapes may be employed.

The size and weight of the stand 100 is dependent on the desired taxidermy mount to be displayed or the styling wishes of the user. In the preferred embodiment of the invention, the kit to make the stand 100 comprises the top panel, the side panels, the attachment assembly and the screws to assemble the stand. If desired, the kit may also include a specialized frill bit and/or a torque-applying device, such as a drill 314 or a screwdriver (not shown). Also optional is a container with an adhesive 312. In some embodiments, the stuffing 310 for the taxidermy mount is included so that the necessary connection between the taxidermy mount 500 and the stand 100 can be easily made. The adhesive 312 helps the polyurethane stuffing 310 support the female connector 304 when inserted into the mount 500.

The stand 100 may be made to size to accommodate taxidermy mounts 500 for both the largest and smallest of game animals. The stand 100 may be shipped or transported in a flat configuration as part of a kit, as shown in FIG. 1, which allows for the easy transport, or can be sold pre-assembled by a retailer.

Many changes and modifications can be made in the present invention without departing from the spirit thereof. I, therefore, pray that my rights to the present invention be limited only by the scope of the appended claims.

I claim:

1. A free-standing support stand for taxidermy mounts, comprising:
   (i) an upright body having a flat top panel extending horizontally when in use, the top panel being provided with a central opening; and
   (ii) an attachment assembly secured in the central opening, the attachment assembly being configured to engage and support a taxidermy mount above the top panel;
   wherein the upright body has a configuration of a truncated square pyramid and comprises a substantially planar front panel, a substantially planar back panel, and a pair of planar side panels, each of the front panel, the back panel, and the side panels having a trapezoidal configuration, the top panel having a rectangular configuration, said front panel, said back panel, said side panels, and said top panel being detachably secured together when in use;
   wherein the front panel and the back panel each is provided with inwardly folded parts extending along respective longitudinal edges of the front panel and the back panel; and
   wherein each of the folded parts is provided with a plurality of spaced-apart openings, wherein a corresponding number of matchingly spaced-apart openings is formed along longitudinal edges of the side panels, said openings being configured to receive a securing member therein, and wherein the folded parts are engageable with the longitudinal edges of the side panels when the openings are aligned.

2. The apparatus of claim 1, wherein the attachment assembly comprises a male connector configured for engagement with the central opening of the top panel and a hollow female connector configured for detachable positioning over the male member, said female connector being detachably engageable with the taxidermy mount, and wherein the female connector is freely rotatable about a vertical axis defined by the male connector.

3. The apparatus of claim 2, wherein the male connector is provided with a circumferential flange configured to rest on an upper surface of the top panel, wherein the female connector is provided with a circumferential flange at a bottom end thereof, the female connector flange resting on the male connector flange when the male connector is engaged with the female connector.

4. A free-standing support stand for taxidermy mounts, comprising:
   (i) an upright body having a flat top panel extending horizontally when in use, the top panel being provided with a central opening; and
   (ii) an attachment assembly secured in the central opening, the attachment assembly being configured to engage and support a taxidermy mount above the top panel;
   wherein the upright body has a configuration of a truncated square pyramid and comprises a substantially planar front panel, a substantially planar back panel, and a pair of planar side panels, each of the front panel, the back panel, and the side panels having a trapezoidal configuration, the top panel having a rectangular configuration, said front panel, said back panel, said side panels, and said top panel being detachably secured together when in use; and
   wherein the top panel is provided with a downwardly extending peripheral lip, said lip being provided with through apertures, and wherein matching apertures are formed along upper edges of each the front panel, the back panel, and the side panels.

5. The apparatus of claim 4, wherein said apertures are configured to receive a securing member therein to thereby secure the top panel to each the front panel, the back panel, and the side panel.

6. A method of supporting a taxidermy mount, comprising the steps of:
   (i) providing a plurality of trapezoidal-shaped substantially planar body panels and a flat rectangular shaped top panel, the top panel being provided with a central opening;
   (ii) providing an attachment assembly configured to engage and support a taxidermy mount;
   (iii) providing a plurality of securing members;
   (iv) securing the body panels and the top panel with the securing members, thereby
   (v) forming a free-standing upright pyramidal-shaped body;
   (vi) securing the attachment assembly with the top panel; and
   (vii) engaging the taxidermy mount with the attachment assembly such that the taxidermy mount extends above the top panel;
   wherein the body panels comprise a front panel, a hack panel, and a pair of side panels, wherein the front panel and the back panel each is provided with inwardly folded parts extending along respective longitudinal edges of the front panel and the back panel, and wherein the method comprises a step of positioning the side panels such that the folded parts overlap longitudinal edges of the side panels before the side panels are secured with the front panel and the back panel.

7. The method of claim 6, wherein each of the folded parts is provided with a plurality of spaced-apart openings, wherein a corresponding number of matchingly spaced-apart openings is formed along longitudinal edges of the side panels, said openings being configured to receive a securing member therein, and wherein the folded parts are engageable with the longitudinal edges of the side panels when the openings are aligned.

8. The method of claim 6, wherein the attachment assembly comprises a male connector and a hollow female connector configured for detachable positioning over the male member, the method comprising the steps of securing the male connector with the top panel, securing the female connector with the taxidermy mount, and engaging the female connector with the male connector in a free rotational relationship about a vertical axis defined by the male connector.

9. The method of claim 8, wherein the male connector is provided with a circumferential and the female connector is provided with a circumferential flange at a bottom end thereof, the method comprising a step of engaging the female connector over the male connector such that the female connector flange rests on the male connector, while male connector flange rests on an upper surface of the top panel.

10. A method of supporting a taxidermy mount, comprising the steps of:

(i) providing a plurality of trapezoidal-shaped substantially planar body panels and a flat rectangular shaped top panel, the top panel being provided with a central opening;
(ii) providing an attachment assembly configured to engage and support a taxidermy mount;
(iii) providing a plurality of securing members;
(iv) securing the body panels and the top panel with the securing members, thereby
(v) forming a free-standing upright pyramidal-shaped body;
(vi) securing the attachment assembly with the top panel; and
(vii) engaging the taxidermy mount with the attachment assembly such that the taxidermy mount extends above the top panel;
wherein the top panel is provided with a downwardly extending peripheral lip, said lip being provided with through apertures, and wherein matching apertures are formed along upper edges of each the front panel, the back panel and the side panels.

11. The method of claim 10, comprising a step of aligning apertures in the lip with the apertures in the upper edges of the front panel, the back panel, and the side panels, and securing the top panel with each of the front panel, the back panel, and the side panels with securing members.

* * * * *